United States Patent [19]
Gilliam

[11] Patent Number: 5,265,845
[45] Date of Patent: Nov. 30, 1993

[54] CAM-ACTUATED SPLIT BALL VALVE

[76] Inventor: Maxie Gilliam, 7531 Morley, Houston, Tex. 77061

[21] Appl. No.: 926,124

[22] Filed: Aug. 5, 1992

[51] Int. Cl.⁵ .............................................. F16K 5/20
[52] U.S. Cl. .................................... 251/163; 251/192
[58] Field of Search ................ 251/160, 162, 163, 192

[56] References Cited
U.S. PATENT DOCUMENTS

| | | | |
|---|---|---|---|
| 2,277,975 | 3/1942 | Heggem | 251/163 |
| 3,124,333 | 3/1964 | Sivyer | 251/163 |
| 3,390,861 | 7/1968 | Masheder | 251/163 X |

Primary Examiner—John C. Fox
Attorney, Agent, or Firm—William E. Shull

[57] ABSTRACT

A split ball closure member is disposed in the central chamber of a valve. The closure member includes a pair of sealing ball halves each having a substantially spherical sealing surface adapted to seal against annular seats in the valve body around the flow passages, and flow portions therethrough. A head member is mounted on the end of the valve operating stem extending into the chamber, for rotation with the stem. The split ball halves are pivotably mounted to the head member to be pivotable about the mounting means alternately to separate the halves from one another or to collapse them toward one another. The closure member is rotatable with the stem and head member alternately to place the flow port portions in register with the seats to open the valve, or to align the sealing surfaces with the seats to close the valve. An actuating cam is disposed in the valve body between the split ball halves for alternately forcing them apart and the sealing surfaces into sealing engagement with the seats when the sealing surfaces are rotated into alignment with the seats, and permitting them to collapse toward one another and away from sealing engagement with the seats when the sealing surfaces are rotated out of alignment with the seats.

6 Claims, 6 Drawing Sheets

CAM-ACTUATED SPLIT BALL VALVE

BACKGROUND OF THE INVENTION

The present invention relates to the field of valves for controlling the flow of fluids therethrough, and more particularly to the field of ball valves. More particularly still, the present invention relates to a cam-actuated split ball valve resulting in low operating torque over a wide range of operating pressures.

In the past, many popular types of valves have been used in many and various environments and applications to control the flow of fluids through a pipeline, conduit, or the like. Gate valves, plug valves, wedge valves, and ball valves, for example, have all found their respective niches in the art of fluid flow control. It is of primary importance for such valves to provide for substantially leak-free operation; it is especially so for valves regulating the flow of high pressure fluids, or potentially hazardous fluids such as highly flammable or caustic substances. Ease of operation, that is, opening and closing, is sometimes as important a feature of a valve, particularly a high pressure valve, as leak-free operation. If a valve cannot be operated quickly and with relatively little effort, besides the wear and tear on the valve parts, the excess time and effort spent in operating the valve, and the related inconvenience associated with such a stubborn valve, it can also lead to other adverse consequences, even posing a threat to lives or property. For example, if a fire were to occur in the vicinity, safety measures taken in precious seconds could mean the difference between containing the emergency, and courting all-out disaster. A valve left open momentarily because the operator could not close it quickly enough could feed the fire, or worse yet, could cause or contribute to an explosion or the like.

Thus, it is clearly desirable and advantageous to employ valves that are both reliable, that is, leakproof, and fast and easy to operate, preferably requiring very low torque attainable with only hand or light tool application. Various approaches have been taken in the past toward meeting these two objectives, with varying degrees of success. For example, floating ball valves have typically employed some means of forcing the seats against the ball mechanically during assembly of the valve in order to seal effectively at low pressures. This practice results in very high operating torque, which is undesirable for the reasons mentioned above. In order to avoid these problems, some manufacturers have chosen to forego low pressure sealability altogether to maintain a reasonably low operating torque. For some types of gate valves, a split gate is employed which relies upon a wedging action of one gate member against the other to force the gate members apart and into sealing engagement with the seats. Such a wedging action itself often requires high input or operating torque, since usually the gate members are spring biased together, and one gate member must be dragged over the other against this spring to force the members apart.

One approach used in the past to reduce the operating torque requirements of valves has been to use shifting seal members, such as shifting O-rings, to eliminate the upstream seal and to limit the formation of a seal to the downstream side of the valve. Such shifting O-rings have been used, for example, in prior art gate valves and plug valves. An example of a shifting O-ring in a gate valve is found in U.S. Pat. No. 2,861,771, issued Nov. 25, 1958, to Bryant. U.S. Pat. No. 2,950,897, issued Aug. 30, 1960, to Bryant discloses additional examples of the use of shiftable O-rings in both a gate valve and a plug valve to effect various desired upstream and downstream seal configurations to accommodate various operating conditions. U.S. Pat. No. 3,307,826, issued Mar. 7, 1967, to Lowrey discloses a through conduit slab gate valve which includes shiftable O-rings employed in pressure actuated seat members. Rather than sealing on one side only of the gate, however, the pressure actuated seat members of Lowrey utilize line pressure to provide an effective seal on both the upstream and downstream sides of the gate. Reliance on shifting O-ring seals is at times undesirable, however, because the O-rings can wear or deteriorate, becoming inoperative and thus defeating their purpose; if they leak, the result (e.g., a valve which is very difficult to open) can be as inconvenient or as undesirable as leakage of the primary valve seals in the first place. In addition, manufacture of valves using shifting O-rings or the like is relatively expensive and complicated, because the bodies have to be provided with shaped seal ring cavities to accommodate the shifting of the seals, and also channels or passages to convey line and body cavity pressures to the desired locations.

Another approach used in the past in connection with floating ball valves toward improving full pressure range sealability while attempting to keep operating torques low has been to spring-bias the seats against the ball closure member, and to change the manner of sealing engagement against the ball under varying applied loads. For example, U.S. Pat. No. 3,331,581, issued Jul. 18, 1967, to O'Connor discloses spring-seat sealing for ball valves using relatively soft plastic seat rings which are biased into engagement with the closure ball and engage the ball to a greater or lesser extent as the applied load varies. Another example of such an approach is found in U.S. Pat. No. 2,989,990, issued Jun. 27, 1961, to Bass, et al. wherein a pair of seat seals of nylon or the like are biased into sealing engagement with the ball by torsional force, and the degree of engagement between the seats and ball varies as applied pressure varies. Valves of these types which rely on the spring biasing ability of plastic seats to maintain full pressure range sealability are susceptible of seal failure due to loss of elastic memory of the seat materials, leading to loss of the spring biasing effect; deterioration of the seats due to exposure to harsh or corrosive line fluids; or to physical damage to delicate "spring fingers" created by the flexible seats.

In addition to valves of the foregoing types, trunnion-mounted ball valves have also been employed in the past to control fluid flow. In such a valve, the solid closure ball is not free to float in the valve cavity, but rather is restrained at both an upper and a diametrically opposed lower location against upstream or downstream movement of the ball. Such valves may be provided with spring biased seats, but are not provided with any means of forcing the solid ball mechanically against the seats, due to the intended restraining action of the trunnion mounting. Thus, they are also susceptible of seal failure for the same reasons mentioned previously for floating ball valves relying on plastic spring biased seats.

It is an object of the present invention to overcome the problems discussed above by providing a valve which will seal effectively over the full operating range, but yet can be operated quickly, easily, and with a minimum of torque. It is also an object of the present invention to provide such a valve which is reliable, durable, and relatively inexpensive to manufacture. It is also an object of the present invention to provide such a valve which retains its ease of operation and low operating torque at very high working pressures.

SUMMARY OF THE INVENTION

The present invention overcomes the problems and drawbacks discussed above with conventional and prior art valves, by providing novel and unique closure means which permit full pressure range sealability and can be operated quickly and easily with a minimum of torque. The closure means of the present invention will operate under high temperatures and pressures, and in the event of a fire, will still be capable of maintaining a suitable safety seal. The closure means of the present invention are reliable, durable, and relatively inexpensive to manufacture. Of particular advantage is the capability of the closure means of the present invention to retain its ease of operation and low operating torque at very high working pressures.

According to the invention, a split ball closure member is disposed in the central chamber of the valve. The split ball closure member includes a pair of sealing ball halves each having a substantially spherical sealing surface adapted to seat and seal against annular seats in the valve body around the flow passages of the valve, and a substantially semi-circular port therethrough. A T-head member is mounted on the end of the valve operating stem which extends into the central chamber, for rotation with the stem. The split ball halves are pivotably mounted to the T-head member such that they are pivotable about the mounting means alternately to separate the halves from one another or to collapse the halves toward one another. The semi-circular ports are opposed to one another to form a substantially circular port through the split ball closure member when the halves are collapsed. The split ball closure member is rotatable with the head member alternately to place the semi-circular ports in register with the flow passages to open the valve, or to align the spherical sealing surfaces with the seats to close the valve. An actuating cam is disposed in the valve body between and engageable with the split ball halves for alternately forcing the split ball halves apart and the spherical sealing surfaces into sealing engagement with the seats when the spherical sealing surfaces are rotated into alignment with the seats, and permitting the split ball halves to collapse toward one another and away from sealing engagement with the seats when the spherical sealing surfaces are rotated out of alignment with the seats.

These and other objects and advantages of the invention will become apparent from the following description of the preferred embodiment when read in conjunction with reference to the following drawings, wherein:

DESCRIPTION OF THE PREFERRED EMBODIMENTS

Figure 1:
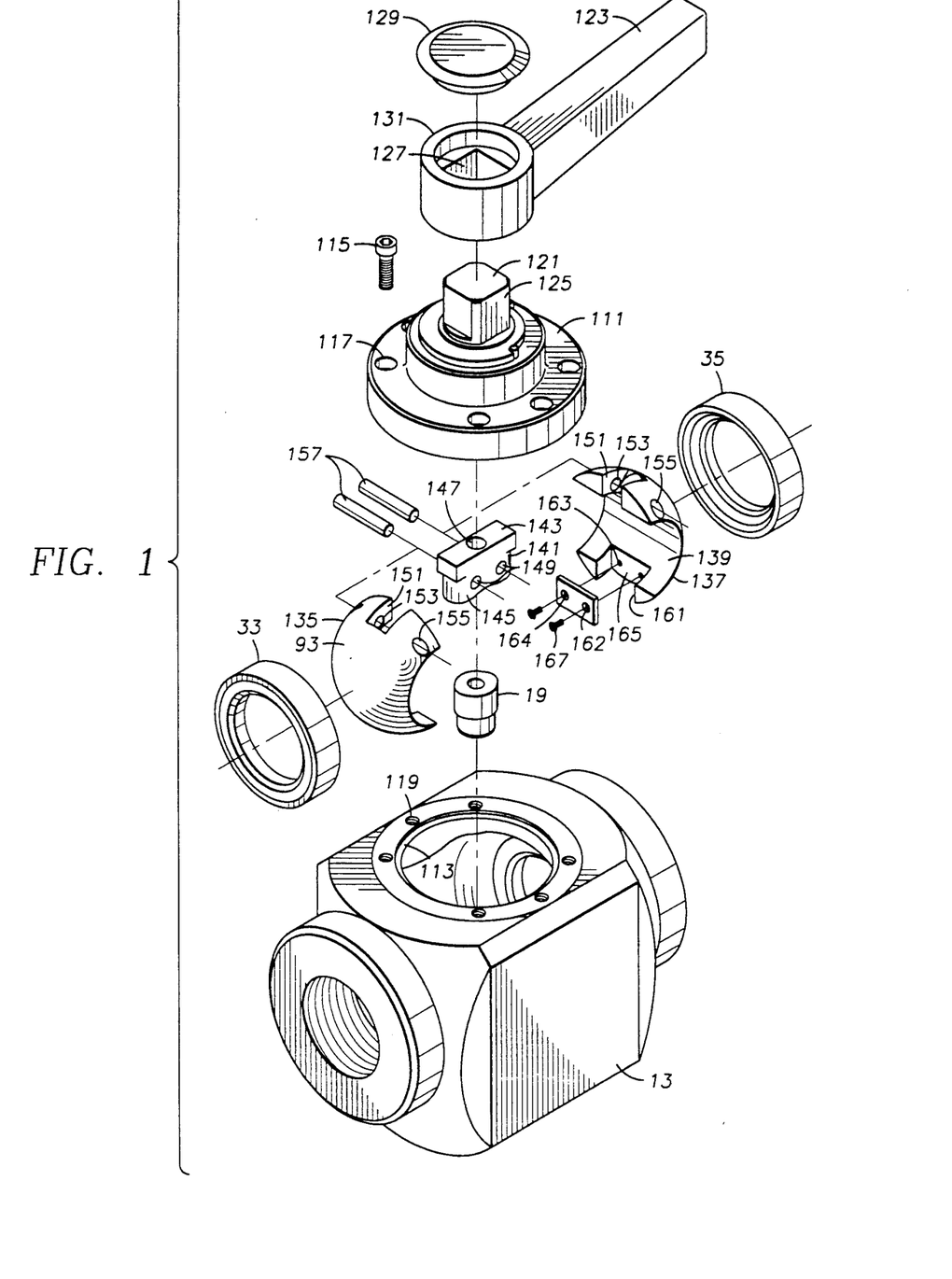
FIG. 1 is an exploded pictorial view of a cam-actuated split ball valve according to the present invention.
Figure 2:
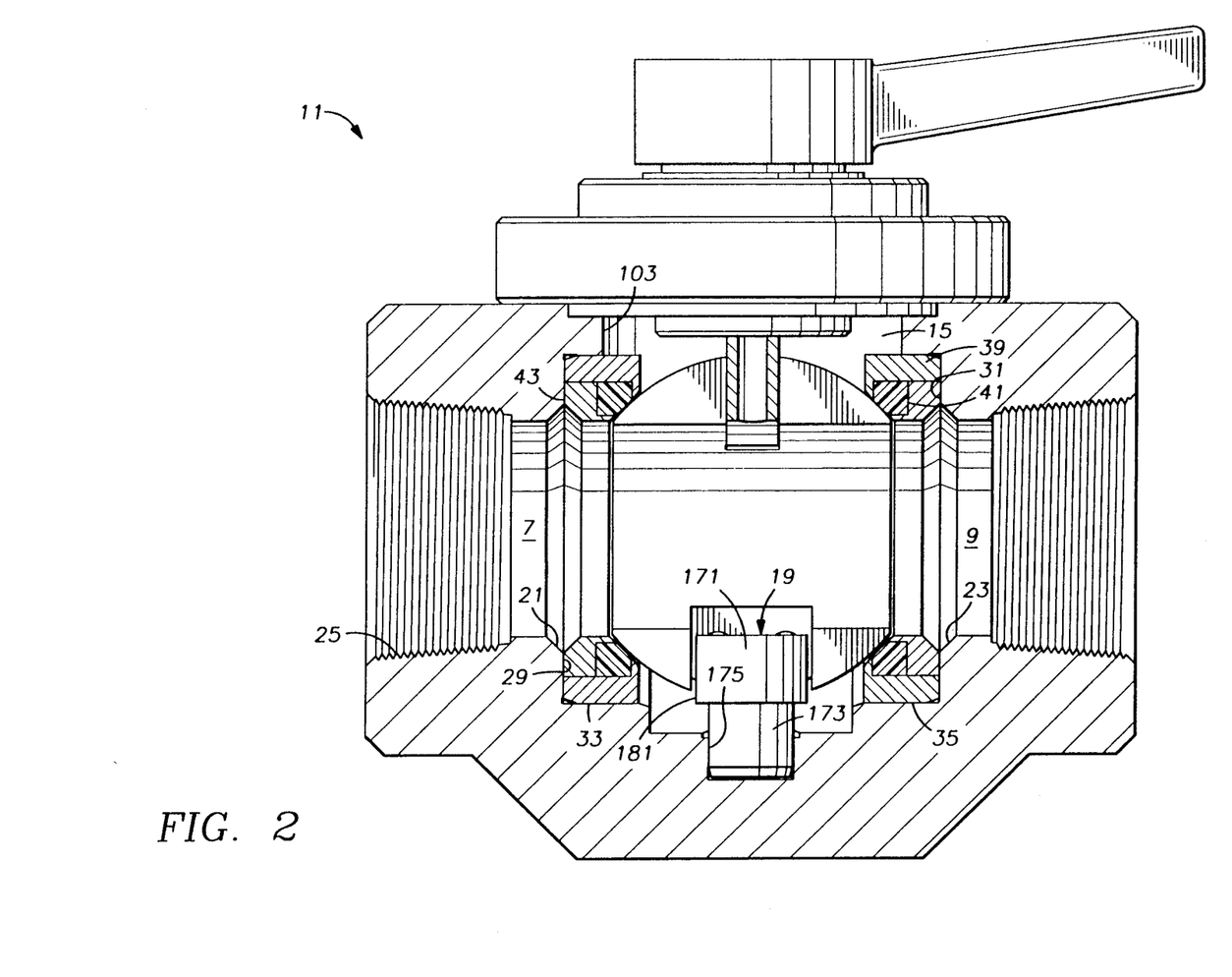
FIG. 2 is primarily a lengthwise or axial, vertical sectional view of the valve of FIG. 1 when assembled, with some parts shown in elevation and with the valve shown in the fully open position.
Figure 3:
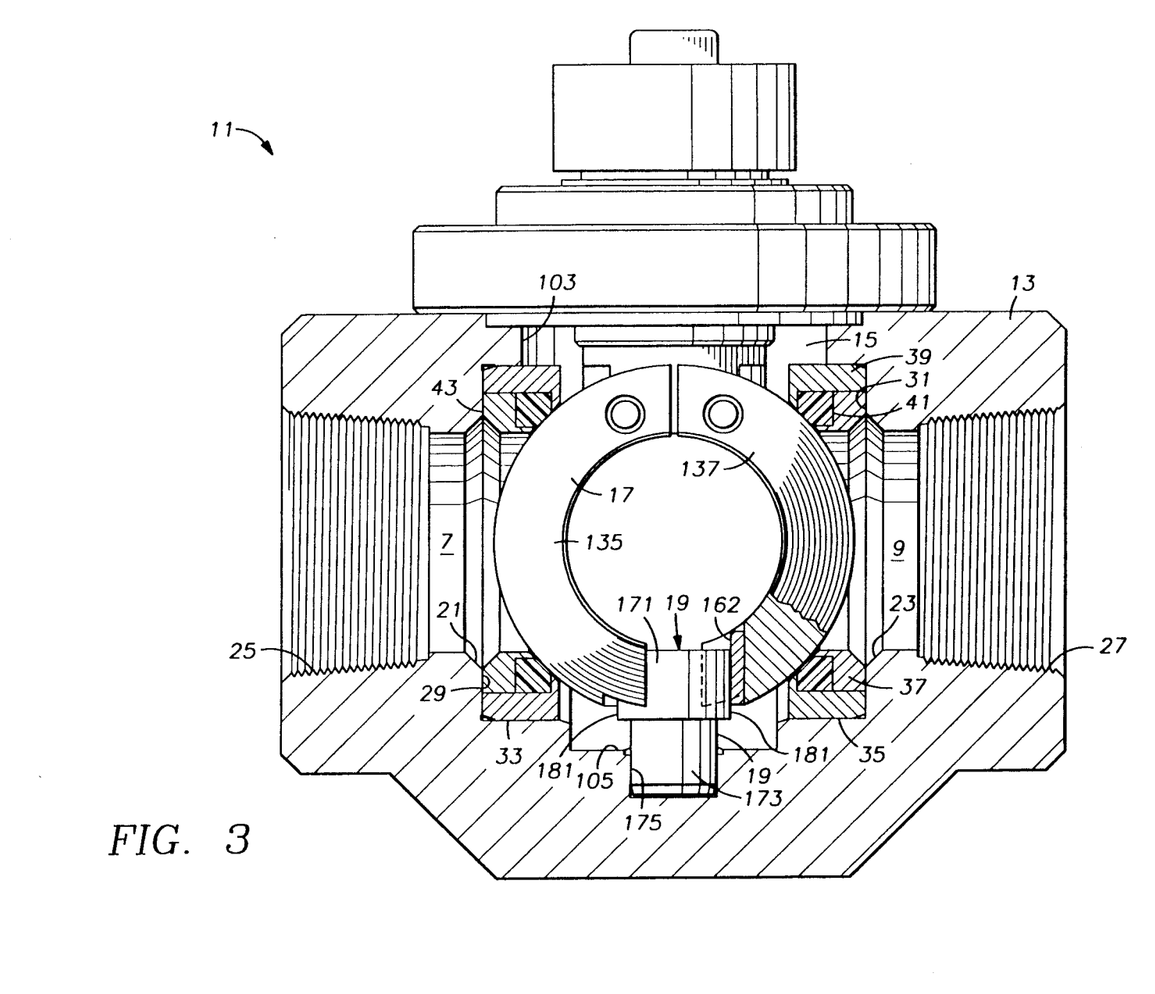
FIG. 3 is primarily a lengthwise or axial, vertical sectional view of the valve of FIGS. 1 and 2, with some parts shown in elevation and with the valve shown in the fully closed position.

Referring initially to FIGS. 1, 2, and 3, there is shown a cam-actuated split ball valve according to the present invention, indicated generally at 11. Valve 11 includes a body 13 having a pair of opposed flow passages 7, 9 therein for accommodating a flow of fluids, i.e., liquids or gases, therethrough, and an enlarged central chamber portion 15, open at its upper end, in which is disposed the split ball closure member 17 and actuating cam 19 of the present invention. Flow passages 7, 9 communicate at their inner ends with annular frustoconical counterbores 21, 23, and at their outer ends with threaded bores or boxes 25, 27. Boxes 25, 27 are adapted for connection to the threaded pin ends of piping or other conduits for incorporating the valve 11 into the flow path thereof.

Figure 6:
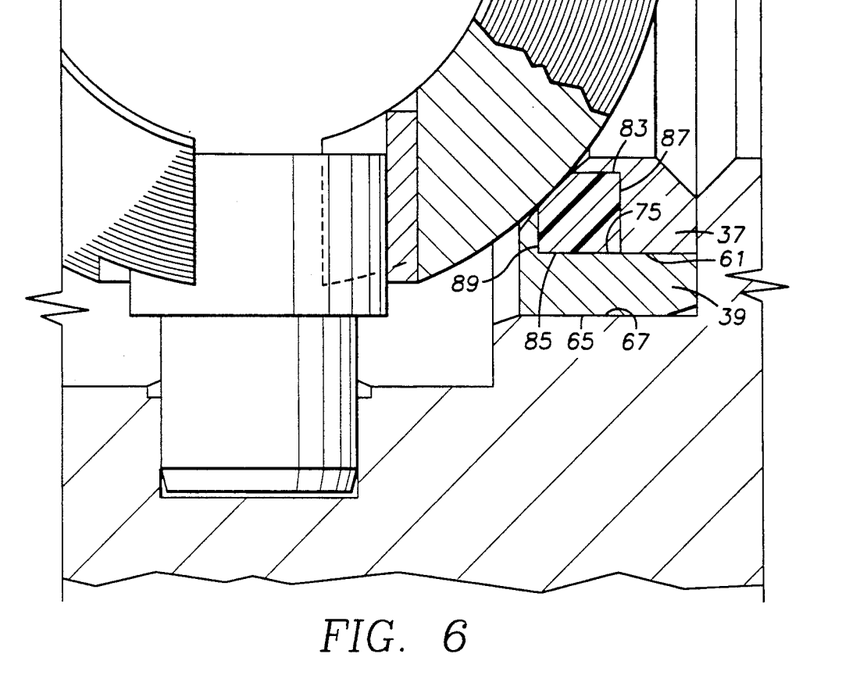
FIG. 6 is an enlarged, fragmentary view, partly in elevation and partly in section and with some parts broken away, of the actuating cam, split ball, and seats of the valve of FIGS. 1-5, showing the valve in the fully closed position.
Figure 7:
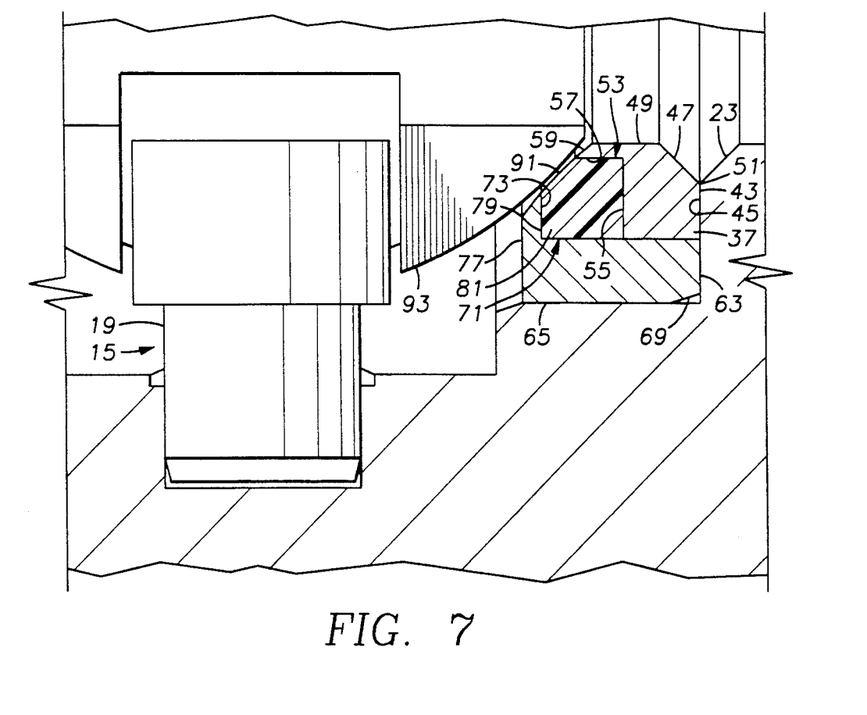
FIG. 7 is an enlarged, fragmentary view, partly in elevation and partly in section, of the actuating cam, split ball, and seats of the valve of FIGS. 1-6, showing the valve in the fully open position.
Figure 8:
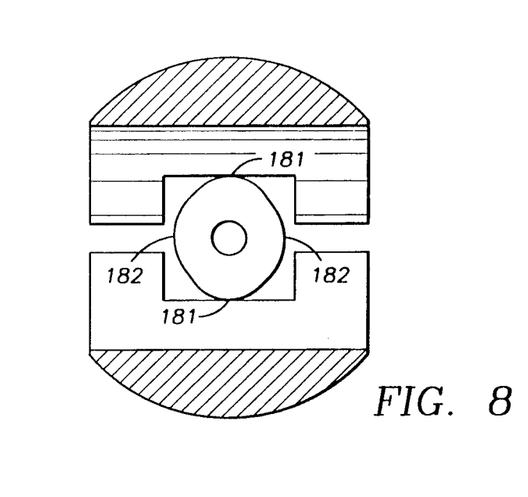
FIG. 8 is a plan view of the cam, and a horizontal sectional view of the split ball, of the valve of FIGS. 1-7, showing the position of the two halves of the split ball with respect to the cam when the valve is in the fully closed position.

Referring additionally to FIGS. 6 and 7, frustoconical counterbores 21, 23 communicate at their inner ends with enlarged, circular cylindrical counterbores 29, 31 in which are disposed a pair of composite valve seats 33, 35. Seats 33, 35 are substantially identical, so only one (seat 35) will be described in further detail. Seat 35 comprises a radially inner seat ring 37, a radially outer seat ring 39, and a seat seal ring 41. Radially inner seat ring 37 has an annular, substantially planer, axially outer face 43 which seats against the annular, substantially planar, axially outer face 45 of counterbore 31. Ring 37 further includes an annular frustoconical surface 47 which extends from surface 43 to a substantially circular cylindrical bore surface 49, and which tapers axially inwardly. The axially outer edge of frustoconical surface 47 is substantially flush with the axially inner edge of frustoconical surface 23 of bore 9, as shown at 51. Ring 37 further includes an annular groove pocket 53 around its radially outer and axially inner surfaces, the pocket 53 including a substantially planar, transversely extending annular wall 55 and a substantially circular cylindrical, longitudinally axially extending annular wall 57 which is adjacent and substantially perpendicular to wall 55. Ring 37 also includes an annular, slightly arcuate, convex or inwardly bowing shoulder surface 59 disposed between the axially inner edges of the substantially parallel bore wall 49 and groove wall 57. Ring 37 has a radially outer wall surface 61 which is substantially circular cylindrical in configuration, and is substantially parallel to bore wall 49 and groove wall 57.

Radially outer seat ring 39 has an annular, substantially planar, axially outer face 63 which seats against the outer face 45 of counterbore 31, and a radially outer wall surface 65 which is substantially circular cylindrical in configuration and which seats against the substantially circular cylindrical, radially outer wall 67 of counterbore 31. Ring 39 further includes an annular frustoconical surface 69 which extends from the radially outer edge of end face 63 to the radially outer wall 65. Ring 39 further includes an annular groove pocket 71 around its radially inner and axially outer surfaces, the pocket 71 including a substantially planar, transversely extending annular wall 73 and a substantially circular cylindrical, longitudinally axially extending annular wall 75 which is adjacent and substantially perpendicular to wall 73. Circular cylindrical surface 75 of ring 39 is substantially flush with outer wall 61 of ring 37. Ring 39 also includes an annular, substantially planar, transversely extending, axially inner face 77 and an annular, slightly arcuate, convex or inwardly bowing shoulder surface 79 disposed between the substantially parallel groove pocket wall 73 and inner face 77.

Seat seal ring 41 comprises a body 81 of substantially rectangular configuration which is disposed or sandwiched in and between the groove pockets 53, 71 of retainer rings 37, 39. Seat seal ring 41 includes radially inner and outer circular cylindrical walls 83, 85 which are seated against walls 57, 75 of rings 37, 39, respectively, and axially outer and inner annular, planar faces 87, 89 which are seated against planar faces 55, 73 of rings 37, 39, respectively. Ring 41 further includes a slightly inwardly protruding, slightly convex or arcuate, annular seal surface 91 which is spaced slightly from the adjacent spherical surfaces 93 of the split ball halves when the valve is open (FIG. 7), but which sealingly engages such surfaces 93 of the split ball halves when the valve is closed (FIG. 6), as is discussed further below. The seal surface 91 of the seat seal ring 41 forms a substantially smooth, continuous, curved or arcuate surface with the adjacent arcuate surfaces 59, 79 of the seat rings 37, 39, such that when the sealing surfaces 93 of the split ball halves make initial contact with the seat seal rings 41, substantially only tangential contact is made between the surfaces 93 and 91.

Composite valve seats 33, 35 are forced into annular counterbores 29, 31 with an interference fit, for example, in the range of 0.005" interference between the outer seat rings 39 and the counterbores, such that a metal-to-metal seal is created between the composite valve seats and the valve body 13. Seat rings 37, 39 may be made of any suitable metal permitting establishment of such a metal-to-metal seal, such as, for example, 410 or 316 stainless steel. Seat seal ring 41 may be made of, for example, nylon, Teflon, urethane, or some other suitable plastics material. Such materials as these may be filled with any of a wide range and variation of additional materials to achieve desired results, such as increased lubricity. Because the valve 11 may be used in harsh environments, such as in extreme heat or cold (including use in fire conditions) and/or with caustic, corrosive, or otherwise harmful or dangerous materials flowing therethrough, it is desirable that the material used for seal ring 41 be strong, durable, tough, relatively resistant to scratching or marring, relatively resistant to harsh and harmful service conditions and environments, and capable of retaining its integrity and sealability over a relatively wide range of temperatures. It is important, of course, that a material is used for ring 41 which is chemically compatible with the fluids expected to flow through the valve. If desired, natural or synthetic rubber or other elastomeric backup seals, such as O-rings, may be provided, for example in annular grooves around the wall 65 of outer seat ring 39 for sealingly engaging the wall 67 of counterbore 31, to ensure that a seal will be obtained between the composite seats 33, 35 and the valve body 13 in the event that the metal-to-metal seal fails. Again, chemical compatibility of any such elastomer backup seal with the fluids expected to flow through the valve is important, as are the criteria for such backup seals of durability, toughness, and resistance to loss of integrity or sealability from heat and cold. In normal, high temperature applications, it may be desired to use metal seal rings 41, rather than the plastics-type materials referred to above, to effect metal-to-metal sealing engagement between the seal rings and the split ball closure member 17. In that event, any type of metal ring typically used for such metal-to-metal high temperature sealing will be suitable for use in the present invention for rings 41. Of course, such metal rings 41 should be capable of deforming or coining somewhat when sealing against the split ball halves to avoid marring or scratching them during opening or closing of the valve when the split ball halves are moved into or out of engagement with the seats.

Chamber 15 includes a central spherical portion 101, having spherically arcuate walls 102, which is larger in diameter than the outer diameter of the spherical split ball closure member 17, for accommodating the split ball closure member therein. Central spherical portion 101 communicates with the flow passages 49 through the composite seats 33, 35, and with an upper 103 and a lower 105 chamber extension portion such that a continuous, hollow valve chamber cavity is formed in the central interior of the valve 11, and such that fluid may pass through the valve from the flow passage 7, through the hollow valve chamber cavity, and out through the flow passage 9. For the sake of convenience, for the remainder of this specification it will be assumed that fluid is flowing from left to right as the valve is viewed in FIGS. 2 and 3, and with this assumption, the flow passage 7 will be referred to as the "upstream" passage, and the flow passage 9 will be referred to as the "downstream" passage. It will be understood, however, that the valve 11 is reversible, i.e., flow passage 7 can act as the downstream passage and flow passage 9 the upstream passage, without materially affecting performance of the valve. Although the interior of the hollow central chamber of valve 11 is shown as being spherical, it may have other shapes, such as circular cylindrical, so long as it is large enough in internal dimension to accommodate the split ball closure member 17.

A bonnet 111 is mounted on top of the valve body 13, around the open upper end 113 of the valve chamber 15, to close the valve chamber. Bonnet 111 is retained on valve body 13 by, for example, a plurality of circumferentially spaced apart cap screws or bolts 115 which are disposed in bores 117 through bonnet 111, and received in threaded blind bores 119 disposed in the valve body 13 around opening 113. Seal means such as an O-ring, a gasket, or the like is disposed in an annular seal groove in either the bonnet or the valve body, to sealingly engage the other of the bonnet or valve body, in order to form a seal between the bonnet 111 and valve body 13. An operating stem 121 is rotatably received in a bore through the bonnet 111, and extends from the upper and lower faces of the bonnet. The operating stem is connected at its inner end to the split ball closure member 17 for rotating and actuating the closure member, and at its outer end to an operator, such as a handle 123, for use in rotating the stem 121. The operating stem is rotatably sealed with respect to the bonnet to prevent leakage of fluids from the chamber 15 to the outside between the valve body 13 and bonnet 111. Suitable bearings are preferably disposed between the bonnet and stem, for example in a pocket in the bonnet around the stem, for easing the operation of the stem. Operating stem 121 is provided with flats 125 or the like for engagement by the correspondingly shaped portion 127 of the operator 123 to enable transmission of torque from the operator to the stem in order to rotate the stem and, hence, the split ball closure member 17, to open or close the valve 11. A cap 129 is mounted on the upper end of the cylindrical body 131 of operator 123.

Figure 4:
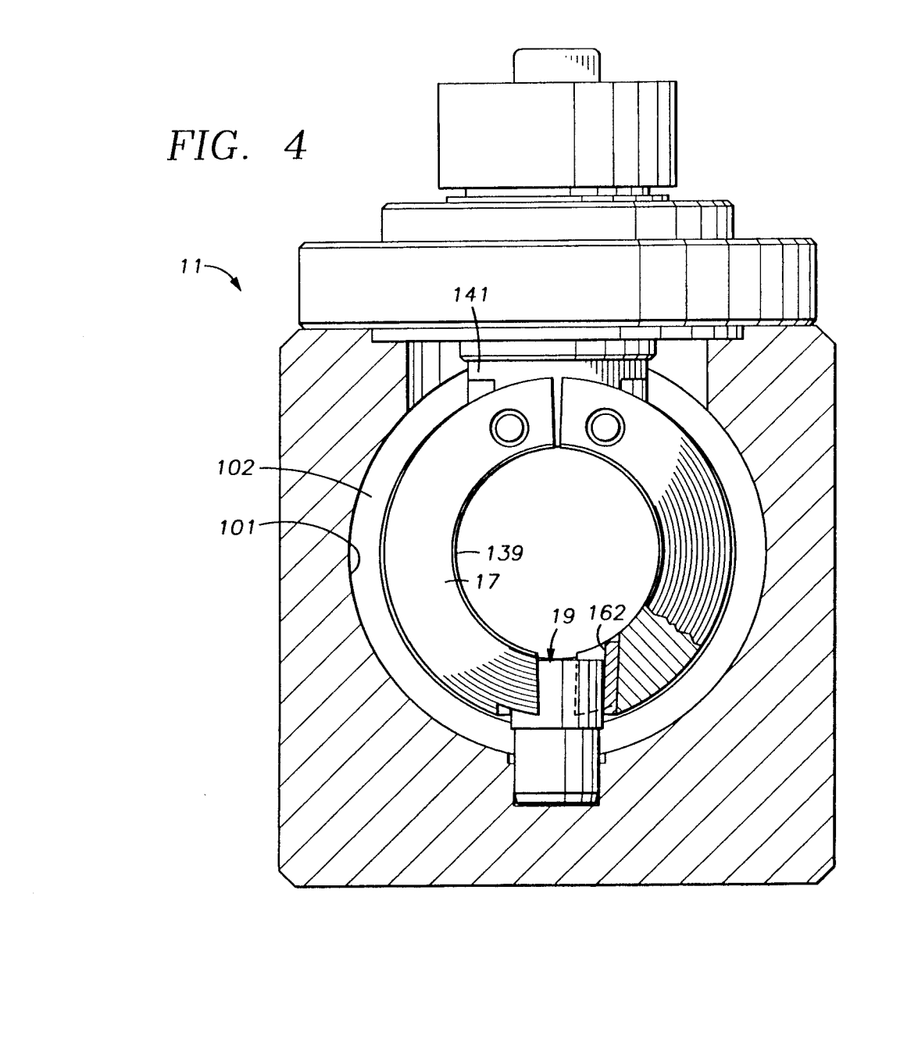
FIG. 4 is a transverse, vertical sectional view of the valve of FIGS. 1-3, with some parts shown in elevation and with the valve shown in the fully open position.
Figure 9:
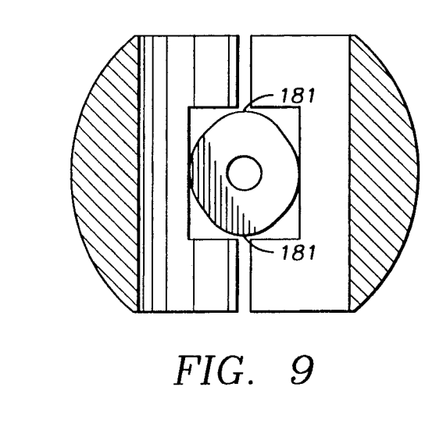
FIG. 9 is a plan view of the cam, and a horizontal sectional view of the split ball, of the valve of FIGS. 1-8, showing the position of the two halves of the split ball with respect to the cam when the valve is in the fully open position.

The valve of the present invention is opened and closed by the operation of split ball closure member 17 and actuating cam 19. Split ball closure member 17 includes a pair of sealing ball halves 135, 137 which are substantially identical to one another. Sealing ball halves 135, 137 have substantially spherical, smooth outer sealing surfaces 93 which are adapted to seat and seal against the annular seal surfaces 91 of seat seal rings 41. Toward the inside portion of the sealing ball halves, the sealing ball halves include a semi-circular cylindrical port 139 therethrough. When the split ball closure member 17 is rotated to place the semi-circular port halves 139, which together comprise a substantially circular cylindrical port, in register with the bores 49 of inner seat rings 37 and with the flow passages 7, 9, a continuous flow path is created through the valve 11. The "valve open" position of the split ball closure member 17 is shown in FIGS. 2 and 4; the position of the split ball halves 135, 137 with respect to the cam 19 in the valve open position is shown in FIG. 9. When the split ball closure member 17 is rotated approximately one-quarter turn so that the port 139, comprising both semi-circular port halves, is disposed transversely of the bores 49 and flow passages 7, 9, flow through the valve 11 is prevented, due to the working or sealing surfaces 93 of the split ball halves engaging the sealing surfaces 91 of the seat seal rings 41. Under normal service conditions and under normal expected loads, leakage from the upstream flow passage 7 to the central body cavity 15 is positively prevented by engagement of split ball half 135 with the upstream seat seal ring 41, and leakage from the central body cavity 15 to the downstream flow passage 9 is positively prevented by engagement of split ball half 139 with the downstream seat seal ring 41.

The split ball halves 135, 137 are pivotably or rotatably connected to a T-head member 141. T-head member 141 comprises a substantially rectangular upper head portion 143, comprising the top of the "T", and a downwardly extending pivot body 145, integrally connected to the upper head portion 143 and comprising the leg of the "T". The T-head member 141 has a circular bore 147 disposed therein and extending entirely through the T-head member from top to bottom. A pair of spaced-apart transverse bores 149 extend through the pivot body 145 from one side to the other of the T-head member 141.

The split ball halves 135, 137 each include an upper transverse slot or channel 151 extending from the tops of the split ball halves to the ports 139. The width of the upper slot 151 in a longitudinally axial direction, that is, in a direction parallel to the longitudinal axis of the ports 139, is such as will accommodate the pivot body 145 of the T-head member therewithin. Near the tops of the split ball halves, each of them has a pair of longitudinally axially extending, axially aligned bores 153, 155 therethrough, so as to create continuous throughbores in the upper portions of the split ball halves. When the two split ball halves 135, 137 are placed on opposite ends of the T-head member, with the ports 139 facing one another, and pivot body 145 is received in each of the upper slots 151, the bores 153, 155 of the split ball halves may be aligned or placed in axial register with the bores 149 in the pivot body 145. Pivot or retaining pins 157 are disposed in the continuous bores 153, 149, 155 so created, and are retained therein by, for example, peening or crimping over the ends of the pins upon assembly of the valve. The split ball halves 135, 137 are free to rotate or pivot about the axes of the retaining pins 157.

The split ball halves 135, 137 also each include a lower transverse slot or channel 161 extending from the bottoms of the split ball halves to the ports 139. Lower transverse slots 161 are preferably greater in width than are the upper slots 151. A wear plate 162 is disposed in each of the lower slots 161, and is retained therein by a pair of screws 167 disposed in bores 164 in wear plates 162, and threaded into a pair of transversely extending, threaded blind bores 163 in the end walls 165 of slots 161.

The upper head portion 143 of the T-head member 141 is received in a correlatively shaped slot in the lower portion of the operating stem 121 so that the T-head member is nonrotatably connected to the operating stem, to permit torque to be transmitted from the stem to the split ball closure member, through the T-head member. The two halves of the split ball closure member 17 are pivotably connected to the pivot body 145 of the T-head member, and disposed in the central valve chamber 15 of valve 11. Thus, the split ball closure member may be rotated about its vertical transverse axis (the term "vertical" being used in its relative sense, with respect to the orientation of the valve shown in the drawings), to move port 139 into or out of alignment with the flow passages 7, 9; and the two halves 135, 137 of the split ball closure member may be rotated about the axes of the pivot pins 157 to separate the two halves or to collapse them toward one another in the valve closing and opening operations, respectively, as will be described further below.

An actuating cam 19, having an upper, lobed head portion 171 and a lower body portion 173 integrally connected to the lobed head portion 171, is disposed in a pocket 175 substantially in the center of the lower surface or floor of the central chamber 15. The lower body portion 173 of the actuating cam 19 may be circular cylindrical in profile, such as shown in FIGS. 1-7, in which case it is press fit into the pocket 175 and retained by friction against rotation; or it may have another shape, such as square or rectangular as shown at 173a in FIG. 10, to fit into a correlatively shaped pocket in order to ensure that the cam will not rotate in the pocket. Upper head portion 171 of cam 19 is provided with a pair of lobes 181, shown in FIGS. 8 and 9, disposed on diametrically opposed sides thereof, forming opposed high sides of the cam. The diametrically opposed sides of head portion 171 located at 90 degrees, that is, one quarter turn, to the lobed sides are substantially circular in shape, forming low sides 182 of the cam. When the cam 19 is in place in its pocket 175, and when the split ball closure member 17 is in place in the central chamber 15, the two halves 135, 137 of the split ball closure member straddle the cam, as shown in FIGS. 3, 4, 8, and 9. The lobed portion 171 of the cam is received in the lower slots 161, with the wear plates 162 engaging the circumferential periphery of the cam. When the split ball closure member is rotated one-quarter of a revolution by rotating the stem 121, the wear plates 162 ride the cam surface from straddling the low sides 182 to straddling the high sides 181, or from straddling the high sides 181 to straddling the low sides 182, as the case may be. When the wear plates 162 straddle the high sides or lobes 181 of the cam, the bottoms of the split ball havles are forced apart, which causes the split ball halves to rotate away from one another, that is, outwardly, about the axes defined by pivot pins 157. When the wear plates 162 straddle the low sides 182 of the cam, the bottoms of the split ball halves may collapse toward one another, which enables the split ball halves to rotate toward one another, that is, inwardly, about the axes defined by pivot pins 157.

Figures 5, 10:
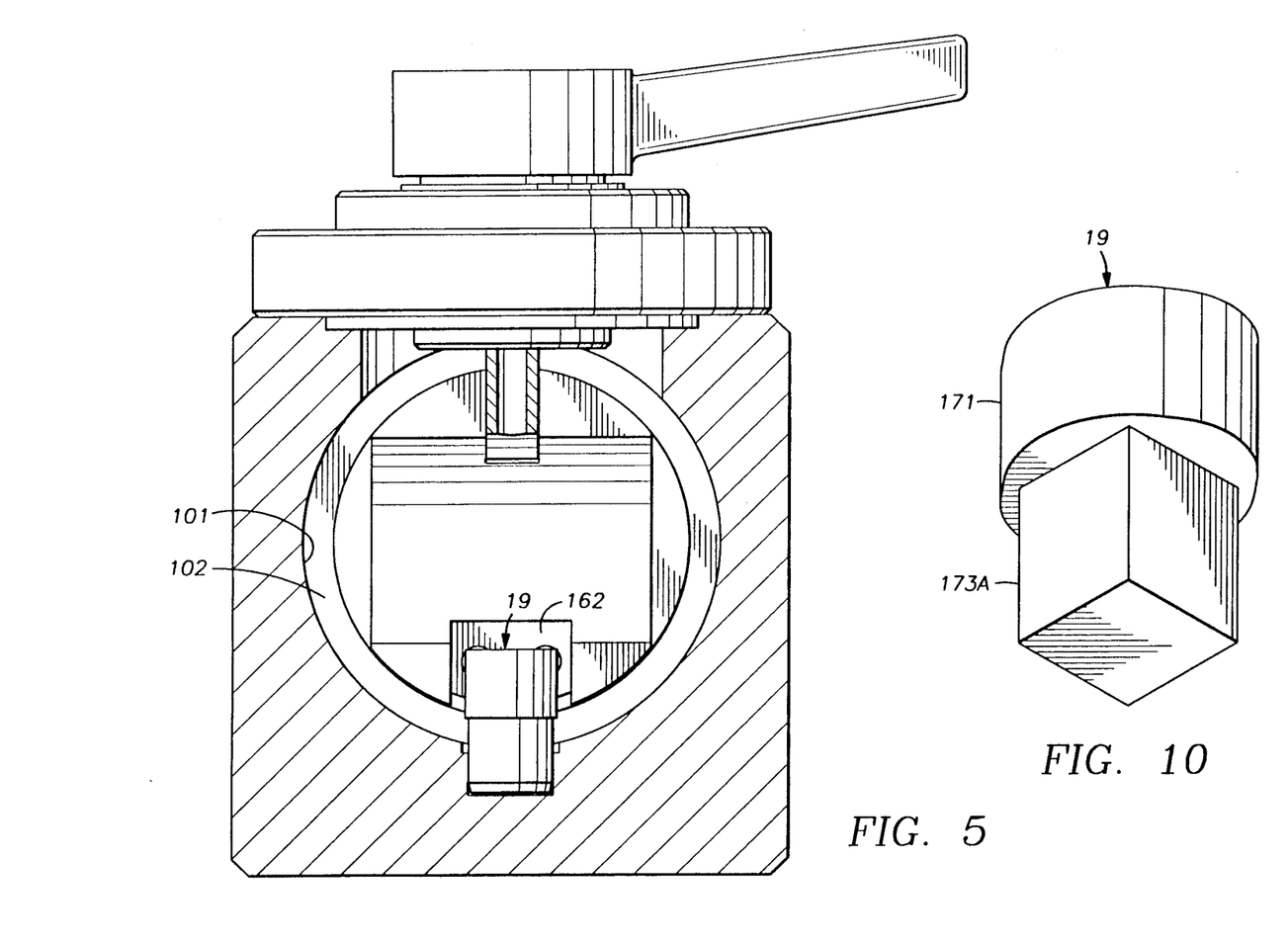
FIG. 5 is a transverse, vertical sectional view of the valve of FIGS. 1-4, with some parts shown in elevation and with the valve shown in the fully closed position.
FIG. 10 is an enlarged pictorial view of an alternative embodiment of the split ball actuating cam of the valve of FIGS. 1-9.

The cam 19 is oriented in its pocket 175 so that an axis of the cam running through both of the lobes 181 is substantially parallel to the axes of the flow passages 7, 9. In other words, the lobes 181 of cam 19 are disposed nearest the seat rings 41, and the low sides 182 of the cam are disposed at about 90 degrees to the seat seal rings. When the split ball closure member 17 is rotatee by stem 121 so that its port 139 is disposed transversel to the flow passages 7, 9, the wear plates 162 ride up onto the lobes 181, forcing the two halves of the split ball closure member apart, about the axes of pins 157. This forces the two halves of the split ball closure member 17, and particularly the spherical sealing surfaces 93 thereof, into tight sealing engagement with the seat rings on the upstream and the downstream sides of the valve. This sealed, valve closed configuration is shown in FIGS. 3, 5, and 6, and is illustrated schematically in FIG. 8. On the other hand, when the split ball closure member 17 is rotated by stem 121 so that its port 139 is in axial register or alignment with the flow passages 7, 9, the wear plates 162 ride down onto the sides 182 of the cam, permitting the two halves of the split ball closure member to callapse toward one another, again, about the axes of pins 157. This removes any force or mechanism holding the spherical sealing surfaces 93 of the halves of the split ball closure member 17 in sealing engagement with the seat rings on the upstream and downstream sides of the valve, and the halves of the split ball closure member are permitted ot collapse away from such sealing engagement, and toward one another. This non-sealed, valve opened configuration is shown in FIGS. 2, 4, and 7, and is illustrated schematically in FIG 9.

In order to assemble the valve of the present invention, first the actuating cam 19 is inserted into its pocket 175, and either press fit into position (in one embodiment described above, namely that wherein the lower part of the cam is circular cylindrical) or simply inserted into the pocket (in the event a polygon-shaped, antirotationally adapted lower cam body is used). Then the split ball halves are dropped into the valve chamber 15, in disassembled condition, along with the T-head member. The split ball halves are then assembled to the T-head member with the pins 157, and the ends of the pins are crimped, peened, or the like in order to retain them in position. The bonnet is then assembled to the top of the valve, such that the lower end of the operating stem engages the upper part of the T-head member. The valve is then ready for service.

With regard to materials used in the valve of the present invention, the split ball halves are preferably made of heat treated 410 or 316 stainless steel, and the remainder of the metal parts, except for the seat rings 37, 39 which are also stainless steel as described above, are preferably made of carbon steel.

In operation, when the valve of the present invention is closed against full rated pressure, some fluid will likely remain trapped in the valve chamber. During the closing process, there will be some leakage past the upstream seat 33 and the split ball half 135 into the valve chamber 15 prior to the upstream seat pressuring up against the split ball closure member; after the upstream seat pressures up against the split ball closure member, such leakage will stop. If desired, such chamber fluid may be bled through the valve body to the downstream flow passage, to atmosphere, or to some other conduit or vessel, through appropriate bleed passages (not shown) provided in the valve body. Whether or not such valve chamber fluid is bled off, the upstream line pressure will in most cases be greater than the valve chamber pressure, and under these conditions the pressure differential acting on the upstream seat 33 will tend to force the seat seal ring 41 further into sealing engagement with the split ball half 135. When opening the valve, if the upstream line pressure is greater than the valve chamber pressure, as soon as the split ball closure member is rotated sufficiently to slide the two halves off the lobes 181 of the cam 19, the mechanical force tending to hold the halves of the split ball closure member against the seats is removed, and the pressure differential on the upstream half 135 of the split ball closure member will tend to collapse this upstream half rapidly away from the upstream seat. This prevents the drag of the upstream seat on the upstream half of the split ball closure member, which would otherwise tend to require a large torque to rotate the closure member to the fully open position. If the valve chamber pressure were bled off prior to opening the valve, there would be no differential pressure acting on the downstream half of the split ball closure member tending to force it against or drag it over the downstream seat 35, thus avoiding significant additional torque requirements to open the valve. If the valve chamber pressure were not bled off prior to opening the valve, differential pressure acting on the downstream half of the split ball closure member would tend to force it against the downstream seat 35, but only until the valve becomes cracked or slightly opened, when the differential would cease. Even if the valve chamber were not bled off first, the usually higher upstream line pressure would still assist in opening the valve, and would still require only a moderate amount of torque as compared to conventional valves, by assisting in the rapid collapse of the upstream split ball half away from the upstream seat. It is preferred that valve chamber pressure be bled off prior to opening the valve, in order to avoid any such drag of the downstream half of the split ball closure member against the downstream seat.

In the event of a fire, the valve of the present invention, if closed, will remain safely closed even if the standard service trim is used, that is, nylon or Teflon seat seal rings, because even if the seat seal rings were to melt, the arcuate surfaces of the seat rings 37, 39 on the downstream side will act as seats against which the downstream half of the split ball closure member 17 may form a metal-to-metal seal. Melting of the upstream seal seal ring will permit upstream line pressure to enter the valve chamber, and will tend to force the downstream half of the split ball closure member into metal-to-metal sealing engagement with the downstream seat rings 37, 39, assuming the downstream seat seal ring 41 has also melted. This metal-to-metal seal on the downstream side will enable the valve to withstand the fire or other emergency condition, and will also permit the valve to be opened and closed against pressure after cool-down. It should be understood that in order to construct a valve such as shown and described herein to be fully fire-safe, the stem seal and bonnet gasket or seal should also be constructed to withstand the fire. A variety of such fire-safe seals and gaskets are on the market and well known to those of ordinary skill in the art.

A cam-actuated split ball valve constructed according to the principles of the present invention will effectively seal at full rated working pressure of about 6,000 psi or greater, and will be operable with a very low torque requirement for opening and closing the valve against such high operating pressures. For example, and not by way of limitation, a 2-inch valve operating under about 6,000 psi, if constructed according to the present invention, can be opened and closed manually by an operator using a small, relatively lightweight, adjustable wrench or the like. A conventional valve of the same size operating under the same high pressures will be very difficult to open manually, if it can be opened at all.

While preferred and alternative embodiments of the invention have been shown and described, many modifications thereof may be made by those skilled in the art without departing from the spirit of the invention. Therefore, the scope of the invention should be determined in accordance with the following claims.

I claim:

1. A valve having a body with an open upper end and flow passages intersecting a central chamber, a bonnet disposed on the body for closing the open upper end, an operating stem rotatably mounted in the bonnet and having an end extending through the bonnet into the chamber, and annular seats in the body circumscribing the flow passages where they intersect the central chamber, comprising:
   a split ball closure member having an upper portion and a lower portion with a split entirely through said split ball closure member at both its upper and lower portions, said split ball closure member being disposed in said central chamber, said split ball closure member including a pair of sealing ball halves formed by said splits and each having an upper portion, a lower portion, a substantially spherical sealing surface adapted to seat and seal against the annular seats in the body, and a substantially semicircular port therethrough;
   a head member mounted on the end of the operating stem for rotation with the stem;
   said split ball halves including means disposed on their upper portions for pivotably mounting said split ball halves independently of one another to said head member such that said split ball halves are pivotable about said mounting means alternately to separate said halves from one another or to collapse said halves toward one another, said semi-circular ports being opposed to one another to form substantially a circular port through said split ball closure member when said halves are in the collapsed state, said split ball closure member being rotatable with said head member alternately to place said semi-circular ports in register with the flow passages to open the valve or to align said spherical seal surfaces with the seats to close the valve; and
   an actuating cam disposed in the valve body between and engageable with the lower portions of said split ball halves for alternately forcing said split ball halves apart and the sealing surfaces thereof into sealing engagement with the seats when said sealing surfaces are rotated into alignment with the seats, and permitting said split ball halves to collapse toward one another and away from sealing engagement with the seats when the operating stem is rotated an incremental amount away from the valve closed position.

2. A valve according to claim 1, wherein each of said split ball halves includes a channel in its lower portion, said channels straddling said actuating cam and having an end wall engaging said cam.

3. A valve according to claim 1, wherein said actuating cam includes a pair of diametrically opposed, increased diameter lobes substantially in axial alignment with said flow passages, and reduced diameter portions adjacent to said lobes and around the remainder of the circumferential periphery of said actuating cam, said split ball halves being forced apart by said lobes when said sealing surfaces are rotated into alignment with the seats.

4. A valve having a body with an open upper end and flow passages intersecting a central chamber, a bonnet disposed on the body for closing the open upper end, an operating stem rotatably mounted in the bonnet and having an end extending through the bonnet into the chamber, and annular seats in the body circumscribing the flow passages where they intersect the central chamber, comprising:
   a split ball closure member disposed in said central chamber, said split ball closure member including a pair of sealing ball halves each having an upper portion, a lower portion, a substantially spherical sealing surface adapted to seat and seal against the annular seats in the body, and a substantially semicircular port therethrough;
   a head member mounted on the end of the operating stem for rotation with the stem;
   said split ball halves including means disposed on their upper portions for pivotably mounting said split ball halves to said head member such that said split ball halves are pivotable about said mounting means alternately to separate said halves from one another or to collapse said halves toward one another, said semi-circular ports being opposed to one another to form substantially a circular port through said split ball closure member when said halves are in the collapsed state, said split ball closure member being rotatable with said head member alternately to place said semi-circular ports in register with the flow passages to open the valve or to align said spherical seal surfaces with the seats to close the valve; and an actuating cam disposed in the valve body between and engageable with the lower portions of said split ball halves for alternately forcing said split ball halves apart and the sealing surfaces thereof into sealing engagement with the seats when said sealing surfaces are rotated into alignment with the seats, and permitting said split ball halves to collapse toward one another and away from sealing engagement with the seats when the operating stem is rotated an incremental amount away from the valve closed position, wherein said means for pivotably mounting said split ball halves to said head member include a transverse bore in each of said split ball halves adapted for alignment with a transverse bore in said head member, and a retaining pin disposed in said bores between each of said split ball halves and said head member.

5. A valve having a body with an open upper end and flow passages intersecting a central chamber, a bonnet disposed on the body for closing the open upper end, an operaring stem rotatably mounted in the bonnet and having an end extending through the bonnet into the chamber, and annular seats in the body circumscribing the flow passages where they intersect the central chamber, comprising:

a split ball closure member disposed in said central chamber, said split ball closure member including a pair of sealing ball halves each having an upper portion, a lower portion, a substantially spherical sealing surface adapted to seat and seal against the annular seats in the body, and a substantially semi-circular port therethrough;

a head member mounted on the end of the operating stem for rotation with the stem;

said split ball halves including means disposed on their upper portions for pivotably mounting said split ball halves to said head member such that said split ball halves are pivotable about said mounting means alternately to separate said halves from one another or to collapse said halves toward one another, said semi-circular ports being opposed to one another to form substantially a circular port through said split ball closure member when said halves are in the collapsed state, said split ball closure member being rotatable with said head member alternatively to place said semi-circular ports in register with the flow passages to open the valve or to align said spherical seal surfaces with the seats to close the valve; and an actuating cam disposed in the valve body between and engageable with the lower portions of said split ball halves for alternately forcing said split ball halves apart and the sealing surfaces thereof into sealing engagement with the seats when said sealing surfaces are rotated into alignment with the seats, and permitting said split ball halves to collapse toward one another and away from sealing engagement with the seats when the operating stem is rotated an incremental amount away from the valve closed position, wherein each of said split ball halves includes a channel in its lower portion, said channels straddling said actuating cam and having an end wall engaging said cam, and further including a wear insert disposed in each of said channels on said end wall for engaging said actuating cam.

6. A valve having a body with an open upper end and flow passages intersecting a central chamber, a bonnet disposed on the body for closing the open upper end, an operating stem rotatably mounted in the bonnet and having an end extending through the bonnet into the chamber, and annular seats in the body circumscribing the flow passages where they intersect the central chamber, comprising:

a split ball closure member having an upper portion and a lower portion with a split extending therethrough forming a pair of sealing ball halves disposed in said central chamber and including means for pivotably connecting each of said sealing ball halves of said closure member to the operating stem independently of the other sealing ball half for rotation with the stem, each of said sealing ball halves of said closure member including a substantially spherical sealing surface adapted to seat and seal against the annular seats in the body when said sealing surfaces are rotated into alignment with the seats, and port means disposed transversely of said sealing surfaces for permitting flow through the valve when said port means are rotated into alignment with the flow passages;

said means for pivotably connecting each of said sealing ball halves of said closure member to the stem including means for permitting said sealing surfaces to be pivoted alternatively apart from and toward one another about said connecting means; and actuating cam means disposed in the valve body and in actuating engagement with said closure member between said sealing surfaces for alternately pivoting said sealing surfaces away from one another and into sealing engagement with the seats when said sealing surfaces are rotated into alignment with the seats, and permitting said sealing surfaces to pivot toward one another and away from sealing engagement with the seats when said sealing surfaces are rotated out of alignment with the seats.

* * * * *